(12) United States Patent
Kuzmin

(10) Patent No.: US 10,949,948 B1
(45) Date of Patent: Mar. 16, 2021

(54) CLOSED FORM METHOD AND SYSTEM FOR LARGE IMAGE MATTING

(71) Applicant: Alexandru Kuzmin, Somerset, NJ (US)

(72) Inventor: Alexandru Kuzmin, Somerset, NJ (US)

(*) Notice: Subject to any disclaimer, the term of this patent is extended or adjusted under 35 U.S.C. 154(b) by 0 days.

(21) Appl. No.: 16/907,268

(22) Filed: Jun. 21, 2020

(51) Int. Cl.
G06T 1/60 (2006.01)
G06T 3/40 (2006.01)
G06T 7/194 (2017.01)

(52) U.S. Cl.
CPC .............. *G06T 3/4038* (2013.01); *G06T 1/60* (2013.01); *G06T 7/194* (2017.01)

(58) Field of Classification Search
CPC .......... G06T 1/60; G06T 3/4038; G06T 7/194
See application file for complete search history.

(56) References Cited

U.S. PATENT DOCUMENTS

| 8,976,169 | B1* | 3/2015 | Barreirinhas | G06T 17/05 345/419 |
| 2009/0034864 | A1* | 2/2009 | Kisilev | G06T 5/004 382/260 |
| 2009/0278859 | A1* | 11/2009 | Weiss | H04N 5/275 345/629 |
| 2010/0149148 | A1* | 6/2010 | Choe | G09G 5/00 345/208 |
| 2015/0254815 | A1* | 9/2015 | Lin | G06T 3/40 382/299 |
| 2016/0015278 | A1* | 1/2016 | Campo | G06K 9/3233 348/143 |
| 2017/0069101 | A1* | 3/2017 | Frosio | G06T 7/11 |

OTHER PUBLICATIONS

Levin et al. ("A closed-form solution to natural image matting," IEEE T. Pattern Analysis and Machine Intelligence, vol. 30, No. 2, Feb. 2008), (Year: 2008).*

Li et al. ("A Survey on Natural Image Matting With Closed-Form Solutions," IEEE Access, vol. 7, Sep. 16, 2019) (Year: 2019).*

Zhu et al. ("An Enhancement to Closed-Form Method for Natural Image Matting," International Conference on Digital Image Computing: Techniques and Applications, Dec. 1-3, 2010) (Year: 2010).*

\* cited by examiner

*Primary Examiner* — Yubin Hung (57) ABSTRACT

A method and system for large image matting, where alpha mask $\alpha_R$ for a large image is built with the help of alpha mask $\alpha_R$ found for the reduced image. In the current context, a large image is an image for which data structures required by the closed form method do not fit available memory. To overcome memory limitation the large image is divided into a plurality of smaller size sub-images. To find an alpha mask for every sub-image a sparse linear system is solved where the pixel values sampled from reduced image alpha mask $\alpha_R$ are used as constraints on a sparse linear system.

10 Claims, 7 Drawing Sheets

FIG. 1.

FIG. 2 a) Sub-image b) Alpha sub-grid corresponding sub-image (a)

c) Recovered alpha sub-mask d) The enlarged area from sub-grid (b) shows the real sub-grid structure

FIG. 3 a) Reduced image b) Reduced image with user defined scribbles: red scribbles marks background, green scribbles marks foreground c) Alpha mask produced by closed form method from (a) and (b) using scribbles as constraints

CLOSED FORM METHOD AND SYSTEM FOR LARGE IMAGE MATTING

FIELD OF INVENTION

This invention relates to image matting.

BACKGROUND OF INVENTION

Image matting is a process of separating image foreground from the image background. Natural image matting is one of the most difficult problems in image editing.

In image matting methods is assumed that an image I is composed of foreground F and background B and the color of i-th image pixel is a linear combination of the corresponding foreground and background pixels $$I_i = \alpha_i F_i + (1-\alpha_i) B_i \qquad (1)$$

where $\alpha_i$ is the foreground pixel opacity. An image where pixel values equal to foreground opacity is referred to as an alpha mask.

Several methods for solving image matting were proposed.

One of the most successful image matting methods is a closed form method proposed in [1] and patented in [4]. While the closed form method works well on images of small and average sizes, high memory consumption makes it not applicable for large megapixel's images. Let's recall that in the current context a large image is an image for which data structures required by the closed form method do not fit available computer memory.

Many modern cameras produce 16 megapixels images, 12 megapixels images are available on many smartphones. While the system of equations for 400×300 pixel image can be easily solved by closed form method on the computer with 16 GB memory, a memory that required by closed form method for 16 megapixels image exceeds 16 GB. If for 16 megapixels image, data structures that required by closed form method, do not fit 16 GB computer memory even theoretically, in practice application of the closed form method to images larger than 8 megapixels is beyond the capability of standard 16 GB computers. It fails because of memory shortage. Memory in real operating systems is fragmented and available continuous fragments are smaller than total available memory.

As we know computer technology is developing very fast, the size of computer memory grows with time. But digital cameras resolution grows with time as well. Due to quadratic dependency between image linear size and matting Laplacian matrix size current situation remain in the future—memory size on many computers will be behind requirements of closed form method for large images.

Several methods were proposed to address the memory problem [1], [2], [3].

Levin et. al. [1] used a coarse-to-fine scheme to overcome memory limitations. They downsample the image and the scribbles and solve alpha in lower resolution. Low resolution alpha is then interpolated to the finer resolution.

He et al. [2] use a KD-tree based technique to decompose trimap so that adaptive kernel size can be assigned to each sub-trimap. The trimap is recursively divided into smaller regions with approximately equal color variance. Then the system of linear equations is solved for each region. First regions which contain foreground F and background B are solved, then regions that do not contain F or B use the solved matte of the neighboring region as boundary conditions.

Xiao et al. [3] compute alpha mate in the reduced feature space. Feature space reduction is based on similar pixels grouping. The final matting result is restored by detailed guided alpha interpolation that uses alpha computed in reduced feature space.

While all mentioned approaches provide enough good quality for many practical purposes, approaches [1], [2], [3] suffering from resolution loss, approach [2] produces unbalanced alpha regions and requires special balancing technique.

SUMMARY OF INVENTION

The present invention provides a method and system for extracting alpha mask from large images without alpha mask resolution loss. The problem of high memory consumption is resolved by large image dividing into smaller sub-images and building alpha mask for each sub-image separately. To find an alpha mask for sub-image, alpha values sampled from the alpha mask found for the reduced original image are used as constraints on the sparse linear system. A final alpha mask is combined from alpha masks that built for sub-images. The proposed method can be executed by systems with limited memory that extend the possibility of its practical usage.

REFERENCES CITED

[1] A. Levin, D. Lischinski, and Y. Weiss. A closed form solution to natural image matting. CVPR, 2006.

[2] K. He, J. Sun, and X. Tang. Fast matting using large kernel matting laplacian matrices. CVPR, 2010.

[3] C. Xiao, M. Liu, D. Xiao, Z. Dong, and K. L. Ma, "Fast closed form matting using hierarchical data structure," Circuits and Systems for Video Technology, IEEE Transactions on, vol. 24, 2014.

[4]. Weiss et al. Closed form method and system for matting a foreground object in an image having a background. U.S. Pat. No. 7,692,664 B2. Issued Apr. 6, 2010.

DETAILED DESCRIPTION

In the following one specific embodiment of the proposed method and system shall be described in detail. As we know the closed form method (CFM) produces state-of-art results while it is problematic to apply the closed form method to large images due to high memory consumption.

As mentioned before the idea behind the proposed method is to build alpha masks for a large image by parts, applying a modified closed form method for each image part and using alpha values found at a smaller scale as external restrictions on a sparse linear system.

Figure 1:
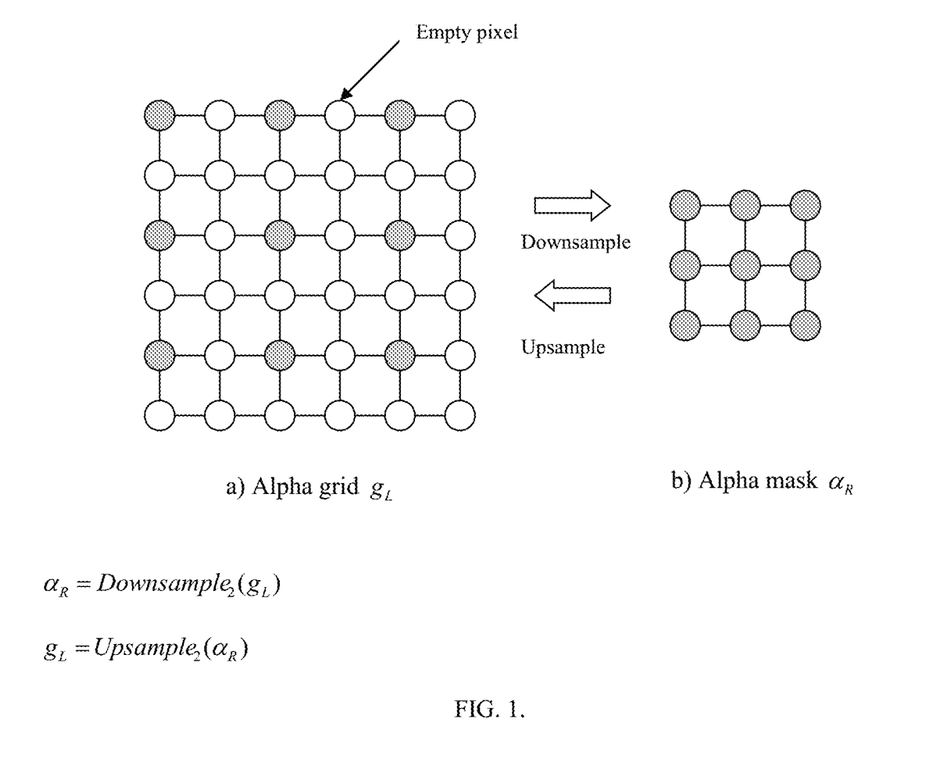
FIG. 1 illustrates the downsampling and upsampling process.

The first step is receiving a reduced version of the original large image. Input image needs to be reduced to a size that can be processed by the closed form method on available memory. Downsampling is used to reduce the image size. Downsampling by m is preserving all m-th rows and m-th columns and removing all others. Downsampling by 2 can be viewed as preserving all even rows and columns and removing all odd rows and columns from the image FIG. 1. In signal processing, downsampling is often used as synonymous with decimation. Decimation is a two steps process where low pass filtering is applied before rows and columns removing. Low pass filtering prevents aliasing. In the proposed method, downsampling by factor m includes only rows and columns removal and defined as $$I_R(i,j)=I_L(m*i,m*j) \quad (2)$$

where $I_L$ is the large image and $I_R$ is reduced image. The proposed restoration method, which is described later, uses information about neighboring pixels dependency and is free from aliasing.

The choice in favor of pure downsampling is based on the fact that it preserves intensity levels at every sampled point.

The next step is receiving an initial alpha mask for the reduced image by closed form method using as constraints user provided scribbles which marks foreground and background pixels.

The closed form method is well suited for providing the initial alpha mask on a reduced image. This method is described in "A. Levin et al: "A closed form solution to natural image matting" [1]. Since the closed form method is used in this step it needs to be explained in detail. The closed form method is based on assumption that in the small window colors lie on a single line in color space.

This assumption allows expressing a as a linear function of the image I $$\alpha_i = aI_i + b, \forall i \in w \quad (3)$$

where $$a = \frac{1}{F-B}, b = \frac{B}{F-B},$$

w is a small window, F foreground, and B background. Assumption (3) is referred to as the color line model. In this embodiment w is 3×3 pixels window. Since this small window w is placed around each pixel, windows placed in neighboring pixels are overlapped. This overlap provides information about neighboring pixels dependency.

The quadratic cost function for a is defined on the basis of the linear assumption $$J(\alpha)=\alpha^T L \alpha \quad (4)$$

where L is an N×N matrix, whose (i, j) element is $$\sum_{k|(i,j)\in w_k} \left(\delta_{i,j} - \frac{1}{|w_k|}\left(1 + \frac{1}{\frac{\varepsilon}{|w_k|}+\sigma_k^2}(I_i - \mu_k)(I_j - \mu_k)\right)\right) \quad (5)$$

where $\delta_{i,j}$ is Kronecker delta, $\mu_k$ and $\sigma_k^2$ are the mean and variance of the intensities in the window $w_k$, and $|w|_k$ is the number of pixels in this window. Matrix L is referred to as matting Laplacian.

The optimal α value is then computed as $$\alpha=\arg\min(\alpha^T L \alpha) \quad (6)$$

Expression (6) is an under-constrained system and external conditions are required to extract the alpha mask.

The user supplied constraints on the alpha mask for the reduced image are provided via scribbles. The user uses background brush (red scribbles in our examples) to mark background pixels (α=0) and foreground brush (green scribbles in our examples) to mark foreground pixels (α=1).

To extract an alpha mask matching user constraints, the following optimization problem is solved $$\alpha=\arg\min(\alpha^T L \alpha + \lambda(\alpha-b_S)^T D_S(\alpha-b_S)) \quad (7)$$

where L is image matting Laplacian, λ is some large number, $D_S$ is a diagonal matrix whose diagonal elements are one for constrained pixels and zero for all other pixels, $b_S$ is the vector containing the specified alpha values for the constrained pixels and zero for all other pixels. Expression (7) is quadratic in α, then the global minimum can be found by differentiating and setting derivatives to zero. After differentiation and setting derivatives to zero, we receive sparse system of linear equations $$(L+\lambda D_S)\alpha=\lambda b_S \quad (8)$$

The solution of (8) gives an alpha mask $\alpha_R$ for the reduced image.

The following step in the proposed method is the reduced image alpha mask $\alpha_R$ upsampling without interpolation to form the alpha grid $g_L$. Upsampling by factor m creates a grid from alpha mask pixels separated by m−1 empty pixels FIG. 1. Empty pixel is denoted by symbol Ø to emphasize that empty pixels and zero pixels are not the same. A zero pixel is a pixel whose numeric value is zero, while an empty pixel is a pixel whose numeric value is unknown. Empty pixels play placeholder roles in the proposed method. Formally upsampling operation is defined as $$g_L(i,j) = U_m(\alpha_R) = \begin{cases} \alpha_R\left(\frac{i}{m}, \frac{j}{m}\right), & \text{if } \frac{i}{m} \in Z, \frac{j}{m} \in Z \\ \emptyset - \text{otherwise} \end{cases} \quad (9)$$

where $g_L$ is the alpha grid, $U_m$ is upsampling by factor m operation, $\alpha_R$ is the reduced image alpha mask, Z is the set of integer numbers. The result of the upsampling operation is referred to as the alpha grid to emphasize the fact that it contains unknown α values between known α values. Downsampling and upsampling are done by the same factor and the alpha grid $g_L$ has the same size as the original image.

Upsampling is usually followed by interpolation in the image scaling process. Only upsampling is used in the proposed method to form an alpha grid from the reduced image alpha mask $\alpha_R$. To recover values in gaps between known α, a modified closed form method is used.

Figure 2:
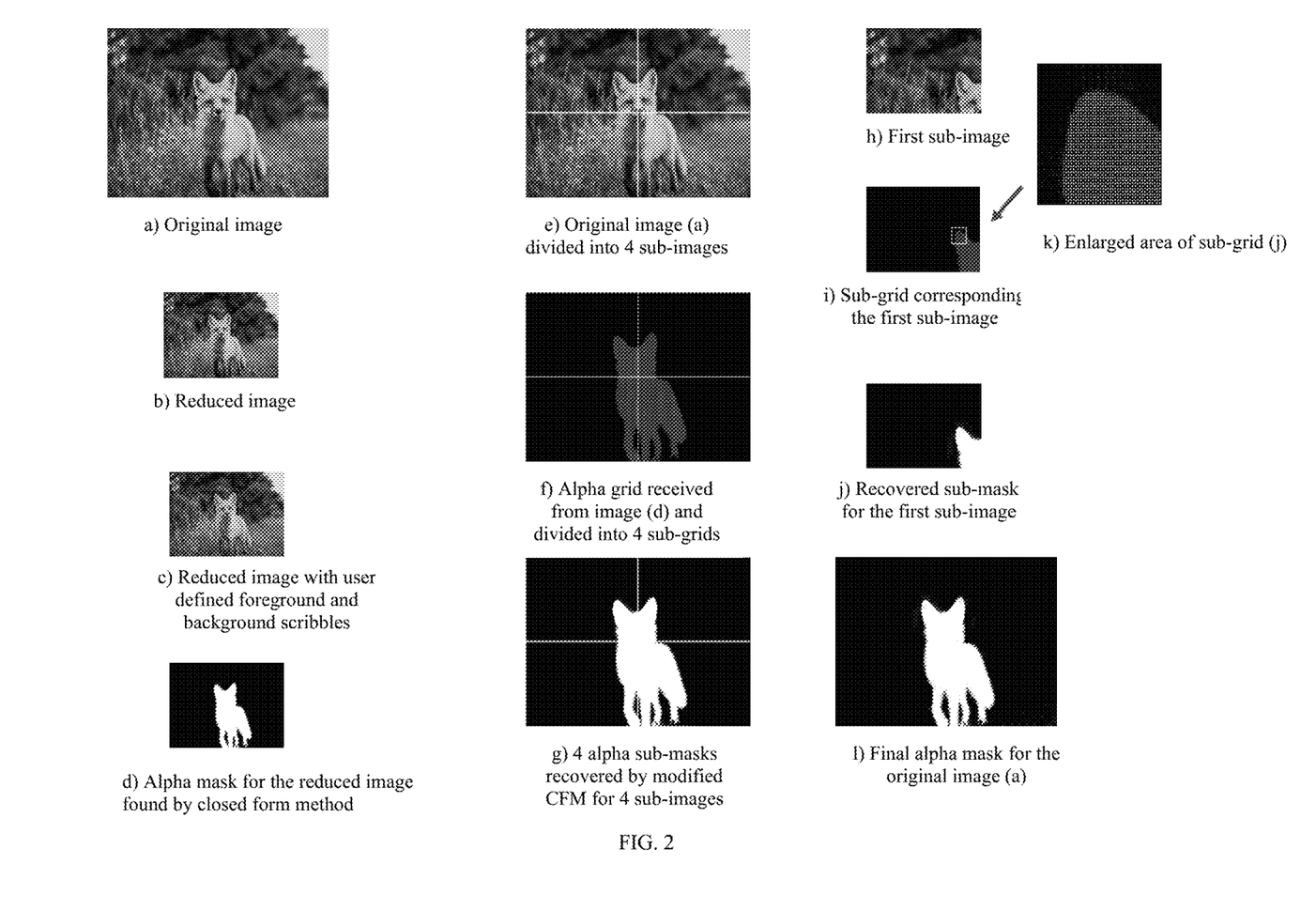
FIG. 2 illustrates principal operations of the proposed method on the large image divided into 4 sub-images.

Following upsampling, the original large image is divided into a plurality of sub-images FIG. 2(*e*). Alpha grid $g_L$ is also divided into a plurality of sub-grids FIG. 2(*f*) by the same pattern as the original large image. So, each sub-image has a corresponding alpha sub-grid.

The size of the sub-image depends on the size of the available memory. The maximum allowed sub-image size is an input parameter in the proposed method. This parameter is used to divide the large image into sub-images. For example, if the maximum allowed sub-image size parameter is 1.5 megapixels then 9 megapixels image needs to be divided into 6 sub-images to fit available memory.

The next step is finding alpha masks for each sub-image. Here a modified closed form method is applied. If to find an alpha mask for reduced image user supplied background and foreground scribbles were used as constraints, in modified closed form method nonempty alpha grid values are used as constraints on the sparse linear system.

For every sub-image matting Laplacian (5) is calculated. Note that every sub-image has the same resolution as the original large image but a smaller size. As was mentioned before, each sub-image size is chosen so that system has enough memory to keep matting Laplacian and other structures required for closed form method.

For every sub-image following optimization problem is solved $$\alpha = \arg\min(\alpha^T L \alpha + \lambda \Sigma(\alpha_i - c_i)^2), c_i \in C \quad (10)$$

where L is sub-image matting Laplacian, $\lambda$ is some number, $c_i$ is the nonempty pixel from alpha sub-grid $g_S$ that corresponds sub-image, C is the set of all nonempty pixels from alpha sub-grid $g_S$.

The meaning of the expression (10) is that we are looking for a solution that is as close as possible to alpha values at the points with nonempty pixels in the alpha sub-grid.

Expression (10) can be written in matrix form $$\alpha = \arg\min(\alpha^T L \alpha + \lambda(\alpha - V_C)^T D_C(\alpha - V_C)) \quad (11)$$

where L is sub-image matting Laplacian, $\lambda$ is some number, $D_C$ is a diagonal matrix whose elements are one for nonempty pixels in alpha sub-grid and zero for all empty pixels, $V_C$ is the vector containing $\alpha$ values of nonempty pixels from alpha sub-grid and zero for all empty pixels.

The expression (11) uses principally different than expression (7) constraints but structurally is similar to (7). Expression (11) is quadratic in alpha and can be solved by differentiating and setting derivatives to zero.

After differentiation and setting derivatives to zero, (11) becomes $$(L + \lambda D_C)\alpha = \lambda V_C \quad (12)$$

The solution of (12) gives an alpha mask for the sub-image. Alpha mask found for sub-image is referred to as the alpha sub-mask.

The described process can be viewed as an unknown pixel values restoration based on known neighboring pixels dependency and information extracted from the image on a smaller scale. Neighboring pixels dependency is described by image matting Laplacian.

The final step is the stitching of alpha sub-masks build for each sub-image. Simple joining is used. Algorithm copies alpha sub-masks to the corresponding sub-images place in the original large image FIG. 2(*l*). Alpha masks received by this method are well balanced and have no seams at sub-masks borders.

Different kinds of interpolation are used in methods [1], [2], [3] to find an alpha mask for a large image. Interpolation from a generic point of view is a guess about what value could be between known values.

Neighboring pixels dependency is a knowledge that contains in matting Laplacian. Neighboring pixels dependency is used in the proposed method to find alpha masks for the parts of a large image and allows getting high-resolution alpha masks for large images.

EXAMPLES

The following examples illustrate the proposed method application to natural images.

Original large image FIG. 2(*a*) is reduced 2 times producing reduced image FIG. 2(*b*), then sparse scribbles FIG. 2(*c*) are created by a user for the reduced image. In examples, red scribbles are used to mark the background, and green scribbles are used to mark the foreground. Alpha mask for reduced image FIG. 2(*d*) is extracted by the closed form method from the reduced image FIG. 2 (*b*) using scribbles for the reduced image shown in FIG. 2 (*c*). Alpha mask FIG. 2(*d*) which has a size of reduced image is upsampled to original image size producing alpha grid FIG. 2(*f*).

Figure 3:
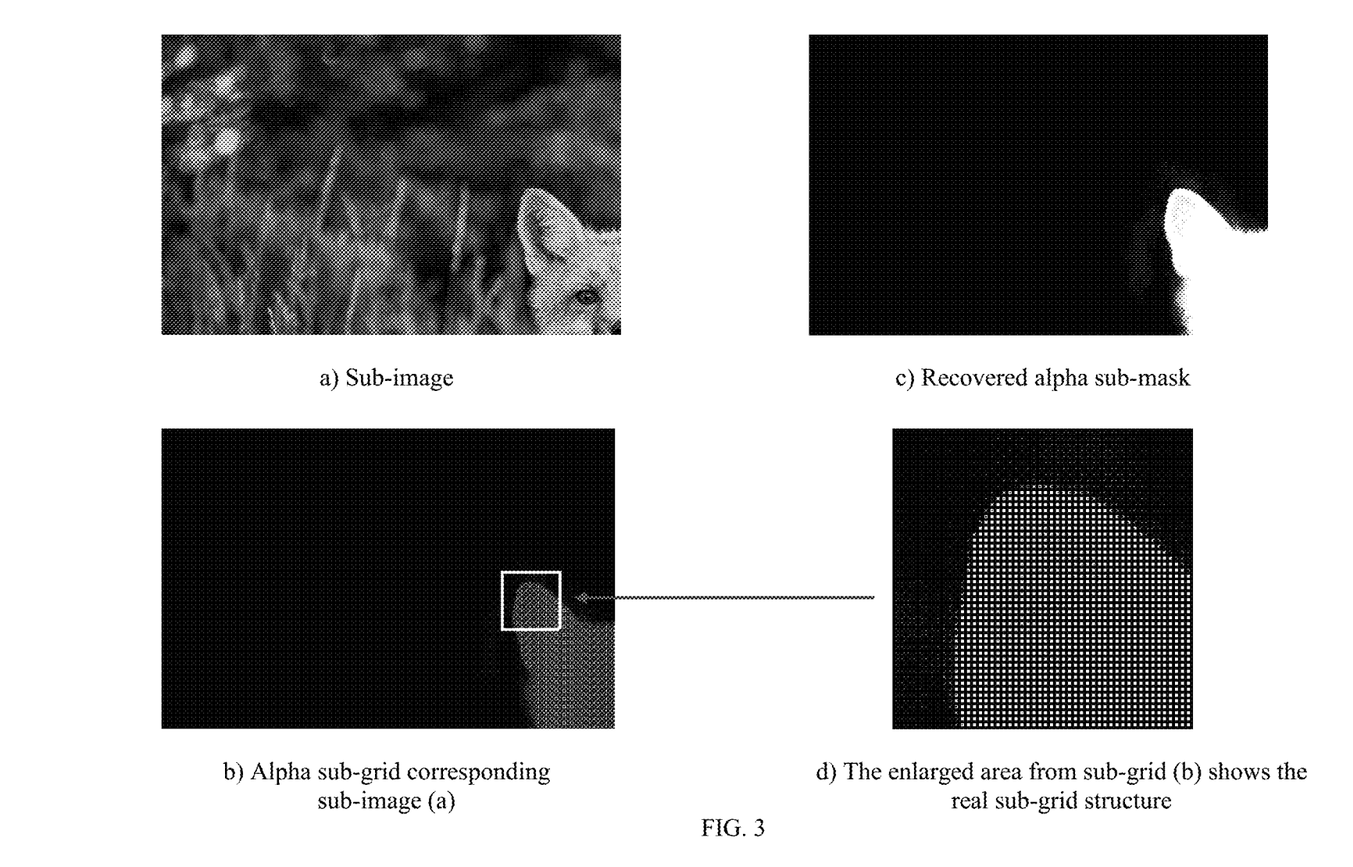
FIG. 3 shows sub-image (a), corresponded upsampled alpha sub-grid (b), and alpha mask (c) recovered by modified closed form method from sub-image (a) and sub-grid (b)

Then the original image and alpha grid are divided into 4 sub-images shown in FIG. 2 (*e*) and 4 sub-grids shown FIG. 2 (*f*). So each sub-image has the corresponding sub-grid. Note that empty pixels are presented in grid images as pixels with zero intensity. They are not distinguishable from zero pixels in the grid images but processed differently in the proposed method. A lot of pixels with zero intensity in the image create a visual side effect. Images of the alpha grid and alpha sub-grids look dark and may be confusing at first glance, especially when they are displayed on small scale. Note that images in the majority of drawings are zoomed out to fit the page size. To provide a more intuitive illustration enlarged area of sub-grid is shown in FIG. 2(*k*). The enlarged image of the sub-grid area gives a better idea of how upsampled alpha mask looks in reality. The first sub-image from FIG. 2, corresponding sub-grid and recovered by modified CFM alpha sub-mask for the first sub-image are shown at larger magnification in FIG. 3. Empty pixels or gaps between upsampled pixels are clearly visible in the image of enlarged sub-grid area FIG. 3 (*d*).

For every sub-image in FIG. 2(*e*) and corresponding sub-grid FIG. 2(*f*) system (12) is solved producing recovered alpha sub-masks FIG. 2(*g*).

Recovered sub-masks FIG. 2(*g*) are combined into the final alpha mask for large image FIG. 2(*l*).

Figure 4:
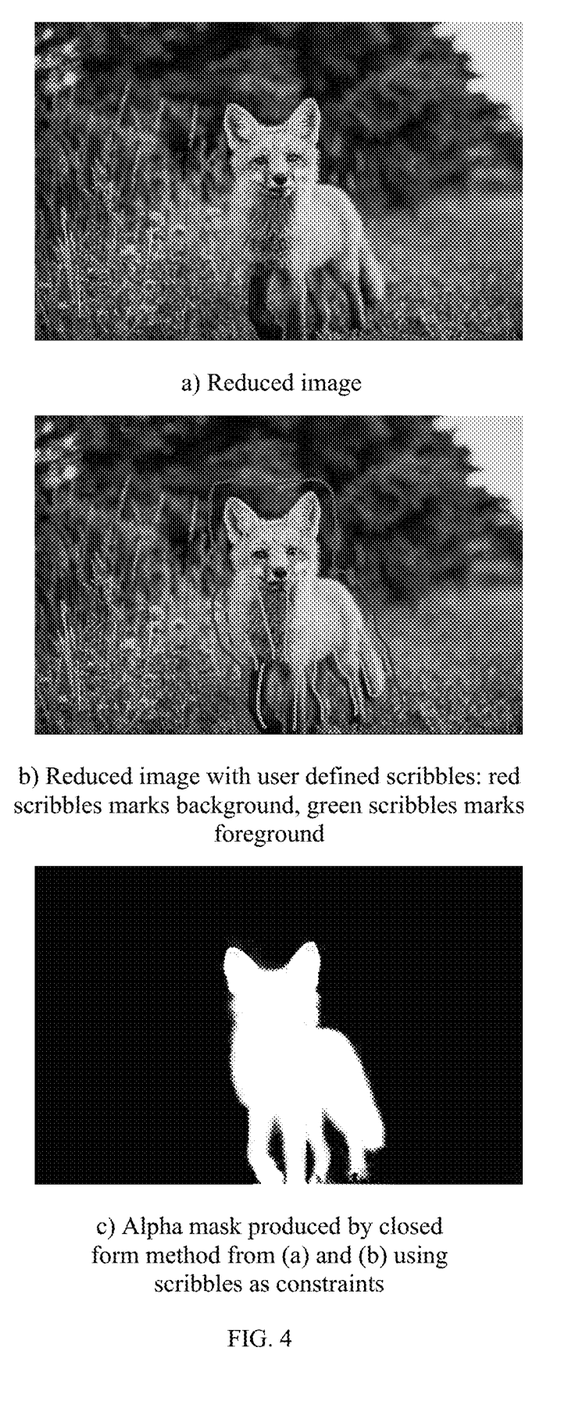
FIG. 4 illustrates the closed form method for a reduced image where alpha mask extracted from the reduced image using constraints provided via scribbles.

FIG. 4. shows the alpha mask building for the reduced image using scribbles as constraints.

Figure 5:
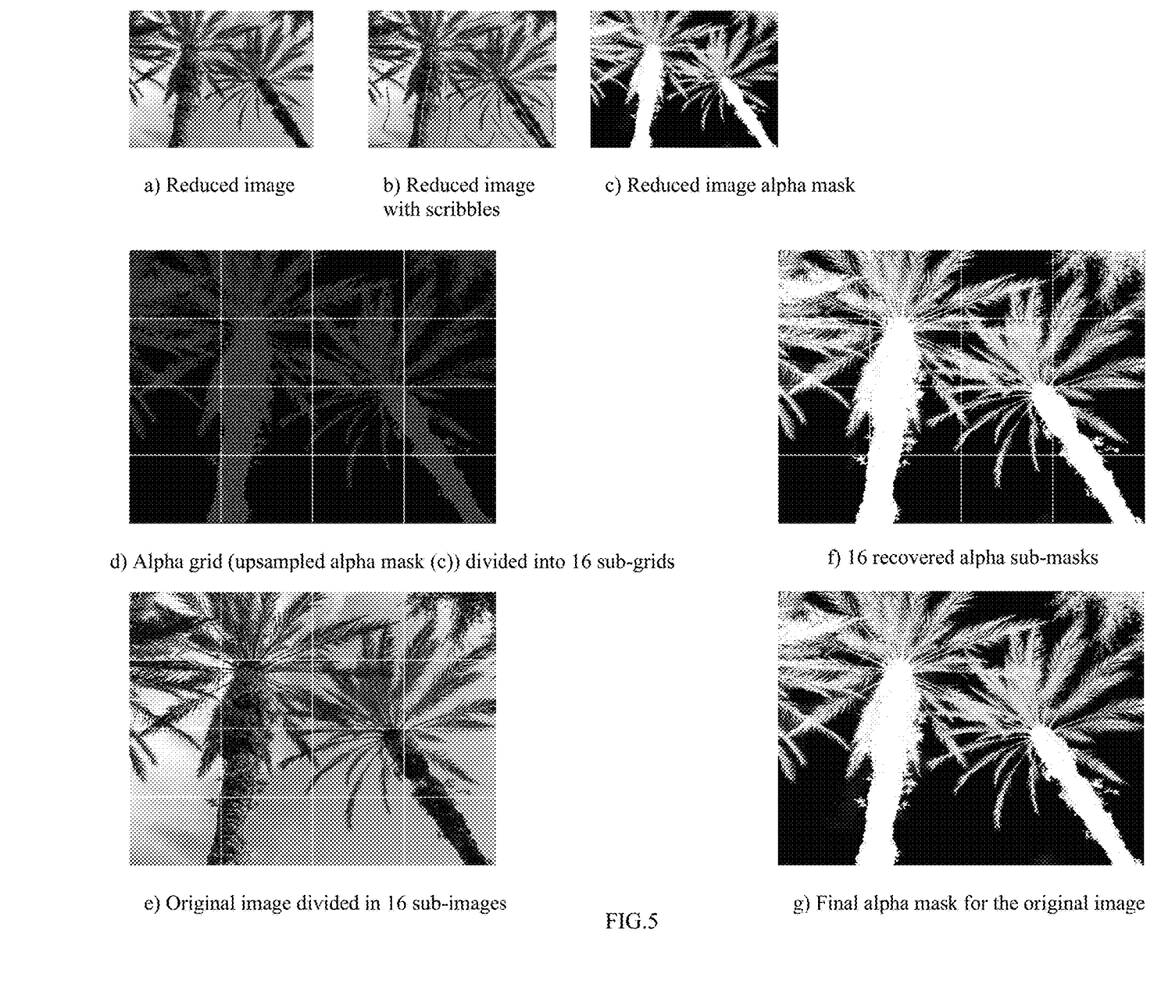
FIG. 5 illustrates principal operations of the proposed method on the large image divided into 16 sub-images.
Figure 6:
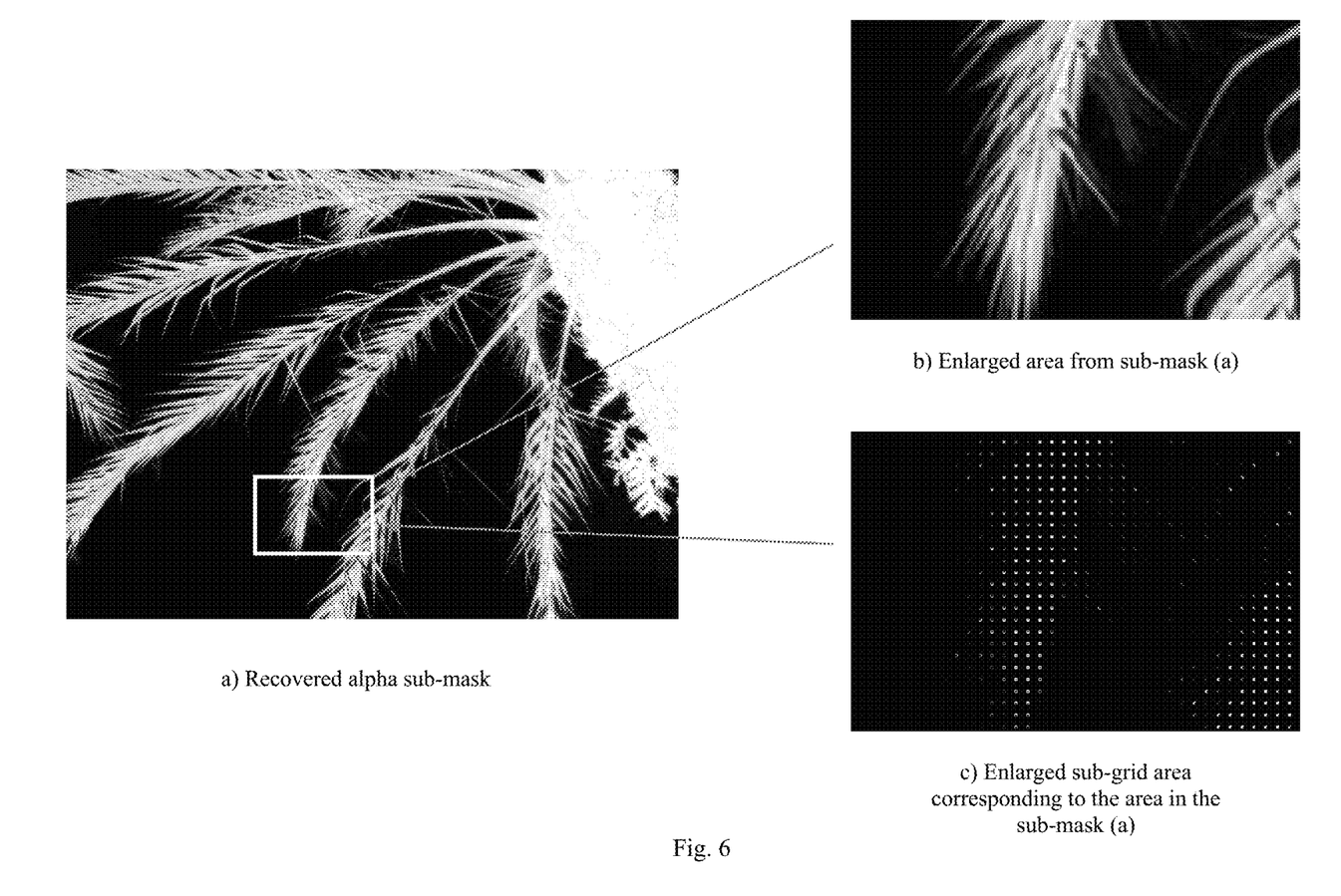
FIG. 6 shows recovered alpha mask for sub-image, enlarged area of recovered mask and corresponding enlarged area of alpha sub-grid.
Figure 7:
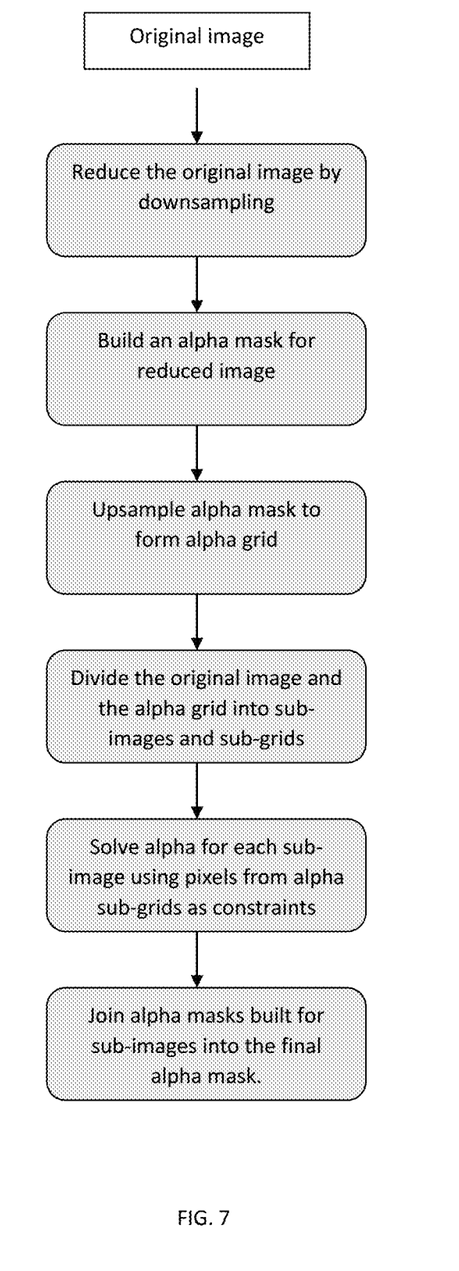
FIG. 7 is a flow diagram showing principal operations of the proposed method for large image matting.

Another example of a larger image is shown in FIG. 5. Input image, to fit available memory resources, is reduced 4 times. Alpha mask received for the reduced image by closed form method is upsampled and divided into 16 sub-grids. As in the example in FIG. 2, each sub-mask FIG. 5(*f*) is recovered by solving the system (12). Enlarged alpha sub-mask area and the corresponding enlarged sub-grid area are shown in FIG. 6.

The invention claimed is:
1. A method for a large image matting comprising:
a) scaling down an original large image to receive a reduced image;
b) building an alpha mask for said reduced image;
c) upsampling said reduced image alpha mask to form an alpha grid;
d) dividing said original large image and said alpha grid into a plurality of sub-images and alpha sub-grids;
e) building an alpha mask for each said sub-image with the help of corresponding said alpha sub-grid by a modified closed form method where the nonempty pixel's values from corresponding said alpha sub-grid are used as constraints on a sparse linear system;
f) building a final alpha mask for said original large image from said alpha masks built for sub-images.

2. The method according to claim 1, wherein said alpha mask for said reduced image is built by closed form method using user defined foreground and background scribbles as constraints.

3. The method according to claim 1, wherein said reduced image alpha mask is upsampled without interpolation, to form said alpha grid of original large image size, leaving empty pixels (gaps) between upsampled alpha mask pixels.

4. The method according to claim 1, wherein said original large image and said alpha grid are divided by the same pattern into a plurality of smaller size sub-images and alpha sub-grids where each sub-image has the same resolution as said original large image.

5. The method according to claim 1, wherein said alpha mask for said original large image is built by joining said alpha masks found for each said sub-image.

6. A system a for large image matting comprising:
a processing unit;
a memory coupled with said processing unit storing instructions executable by processing unit;
the instructions being operable to:
 a) scaling down an original large image to receive a reduced image;
 b) building an alpha mask for said reduced image;
 c) upsampling said reduced image alpha mask to form an alpha grid;
 d) dividing said original large image and said alpha grid into a plurality of sub-images and alpha sub-grids;
 e) building an alpha mask for each said sub-image with the help of corresponding said alpha sub-grid by a modified closed form method where the nonempty pixel's values from corresponding said alpha sub-grid are used as constraints on a sparse linear system;
 f) building a final alpha mask for said original large image from said alpha masks built for sub-images.

7. The system according to claim 6, wherein said alpha mask for said reduced image is built by closed form method using user defined foreground and background scribbles as constraints.

8. The system according to claim 6, wherein said reduced image alpha mask is upsampled without interpolation, to form said alpha grid of original large image size, leaving empty pixels (gaps) between upsampled alpha mask pixels.

9. The system according to claim 6, wherein said original large image and said alpha grid are divided by the same pattern into a plurality of smaller size sub-images and alpha sub-grids where each sub-image has the same resolution as said original large image.

10. The system according to claim 6, wherein said alpha mask for said original large image is built by joining said alpha masks found for each said sub-image.

* * * * *